Oct. 31, 1961   L. F. JUMELLE ET AL   3,006,587
SUSPENSION DEVICE FOR JET PROPULSION UNITS
Filed Nov. 8, 1957   7 Sheets-Sheet 1
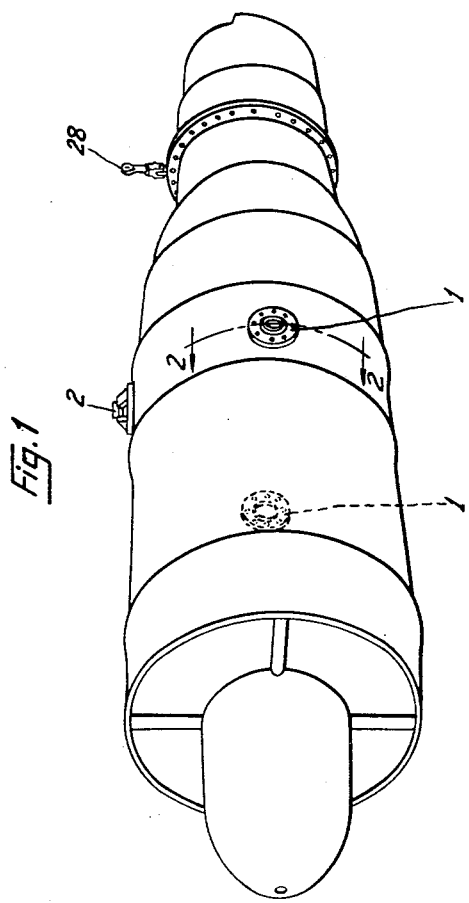
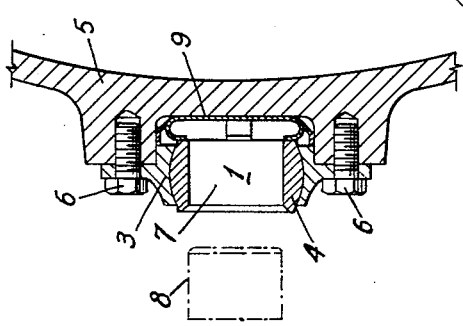
INVENTORS
Louis F. Jumelle, Max A. J. Morel,
Paul J. Legrand & Konrad A. W. Eichholtz
By
Watson, Cole, Grindle & Watson
(Attorneys)

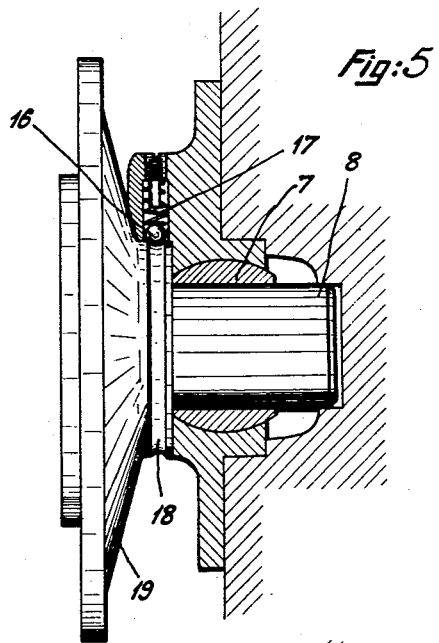
Fig:5
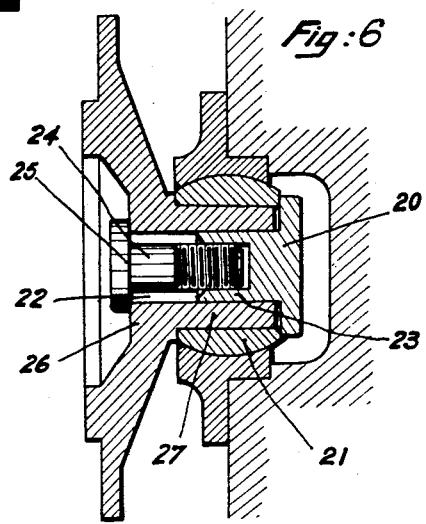
Fig:6

Oct. 31, 1961  L. F. JUMELLE ET AL  3,006,587
SUSPENSION DEVICE FOR JET PROPULSION UNITS
Filed Nov. 8, 1957  7 Sheets-Sheet 4
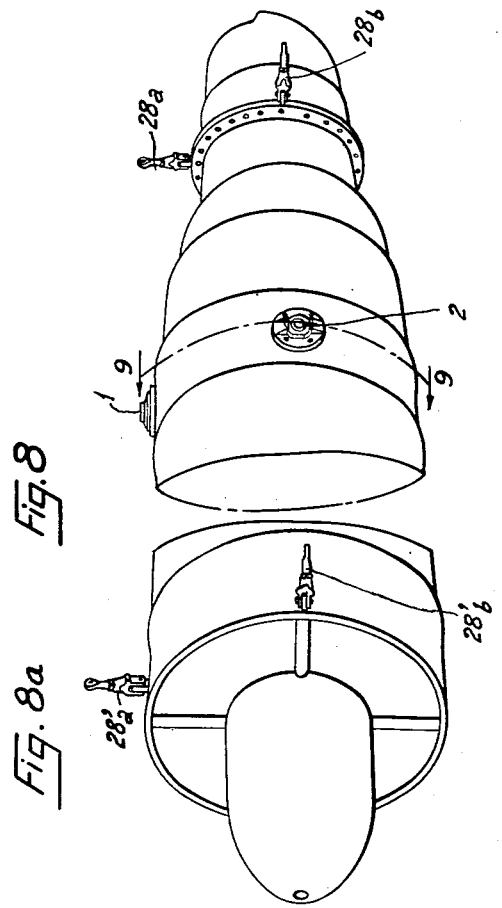
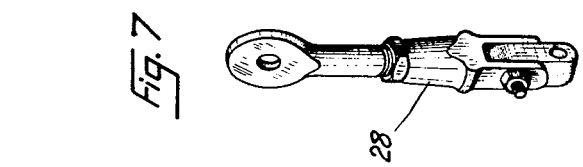
INVENTORS
Louis F. Jumelle, Max A.J. Morel
Paul Joseph Legrand + Konrad A.W. Eichholtz
By
Watson, Cole, Grindle & Watson
(Attorneys)

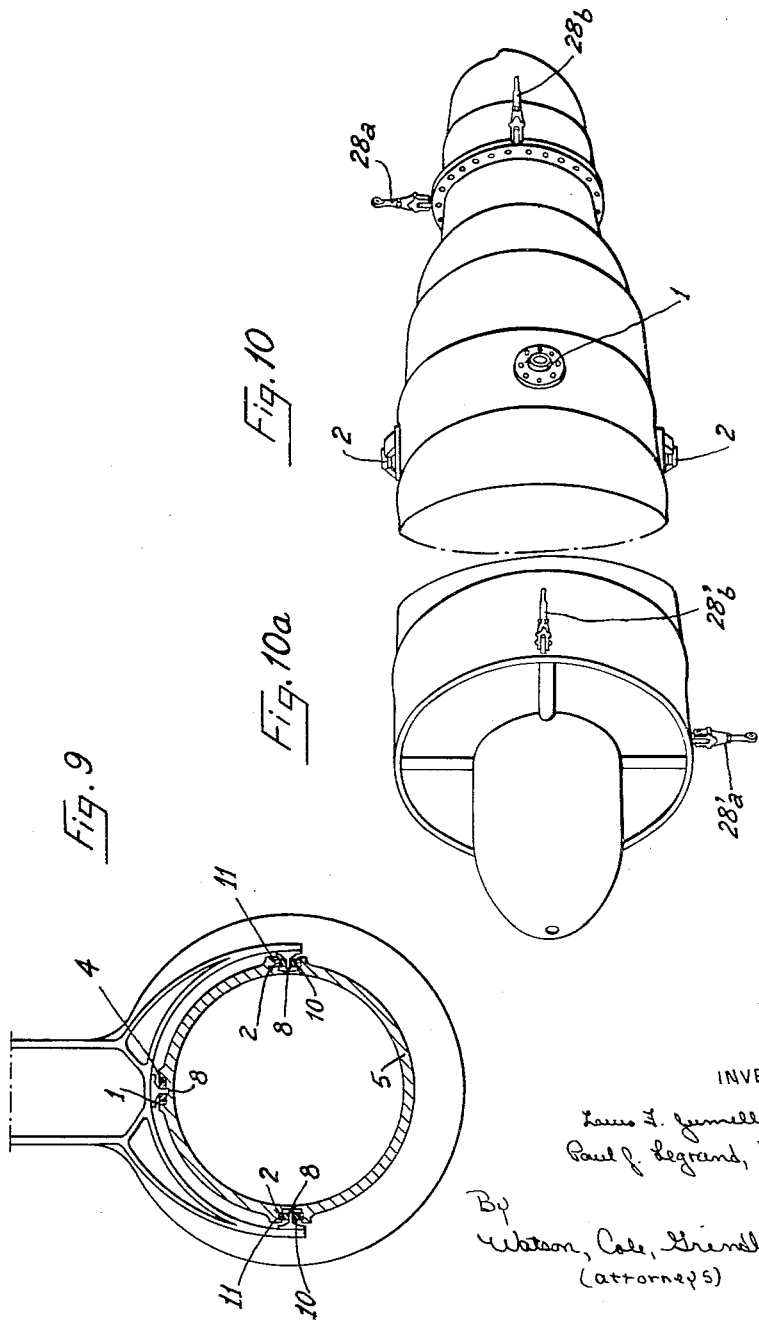

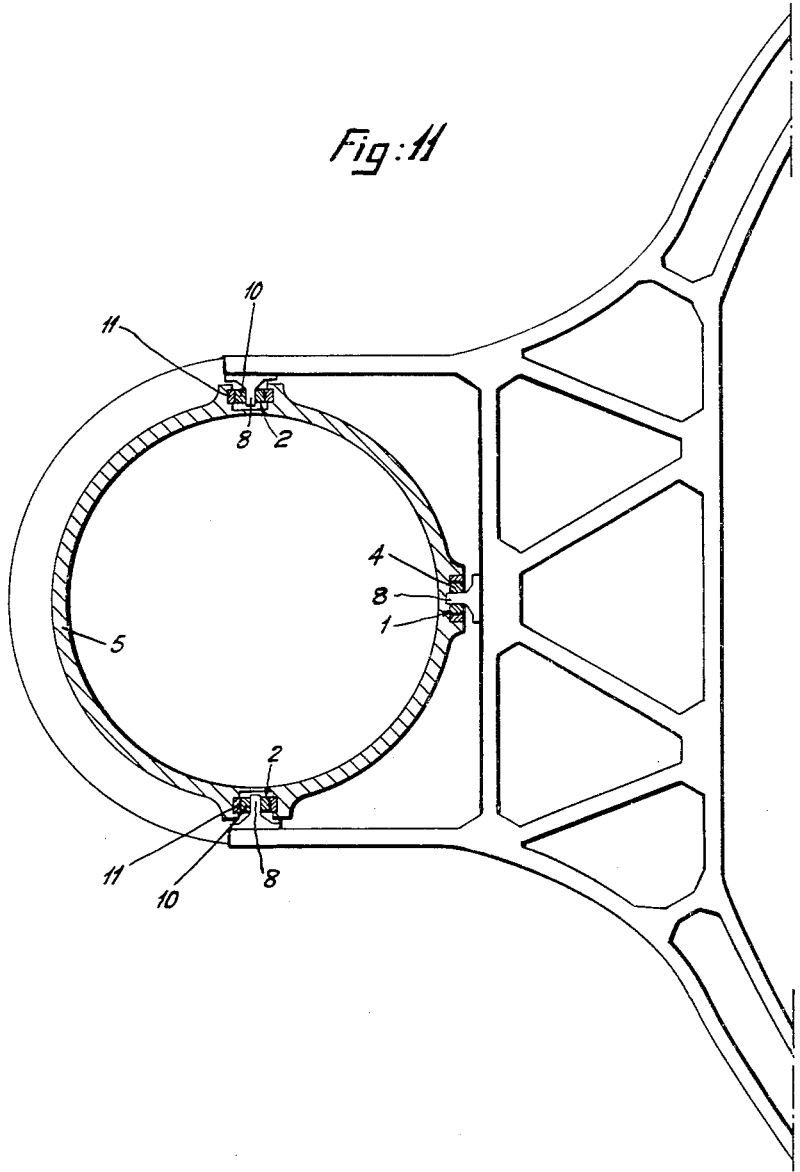
Fig:11

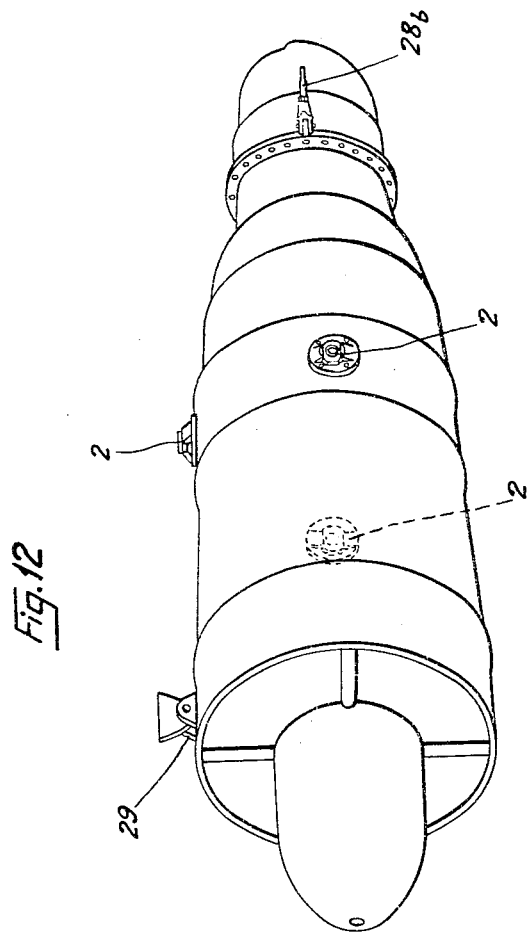

of the whole assembly is concerned) to be transferred to the nacelle which is at a relatively low temperature, and not, as in the known arrangements, to the casing of light or ultra-light alloy, the temperature of which increases with the increasing tendency to high ratios of compression and higher speeds of flight.

On the other hand, this device enables the strength of the suspension frames of the nacelle to be increased in consequence of the permitted increase in the size of the structural members of these frames, because of the absence of the said reinforcements, at the precise point at which these stresses and moments are applied.

The description which follows below with reference to the accompanying drawings (which are given by way of example only and not in any sense by way of limitation), will make it quite clear how the invention may be carried into effect.

FIG. 1 is a diagrammatic view in perspective of a jet propulsion unit provided with a suspension in accordance with the invention.

FIG. 2 is a cross-section on line 2—2 of FIG. 1 showing a swivel support incorporated in the wall of a casing.

FIG. 5 shows a method of holding the trunnion in position during the hoisting of the jet propulsion unit in certain cases of erection.

FIG. 6 shows a particular form of fixation of the trunnion and the swivel member which enables radial stresses to be transmitted in certain cases.

FIG. 7 is a perspective view of a further suspension of a known type.

FIG. 8 is a view similar to that of FIG. 1, showing a different arrangement of the suspension members of the jet propulsion unit.

FIG. 8a shows a modification of the suspension of FIG. 8.

FIG. 9 is a diagrammatic transverse cross-section on line 9—9 of FIG. 8 showing how this jet propulsion unit is suspended.

FIGS. 10, 10a and 11 are views similar to those of FIGS. 8, 8a and 9 respectively, in the case of an alternative form of construction.

FIG. 12 is a perspective view of a further alternative form of embodiment.

In the form of embodiment of FIG. 1, the jet propulsion unit is suspended by two lateral swivel supports 1—1 provided at the extremities of a horizontal diameter close to the centre of gravity of the propulsion unit. A third support 2, also of the swivel type, is provided at the upper or lower part of the jet propulsion unit, in the transverse plane passing through the supports 1—1, the latter swivel member being mounted in a slidable manner in a direction parallel to the longitudinal axis of the jet propulsion unit.

Figure 3:
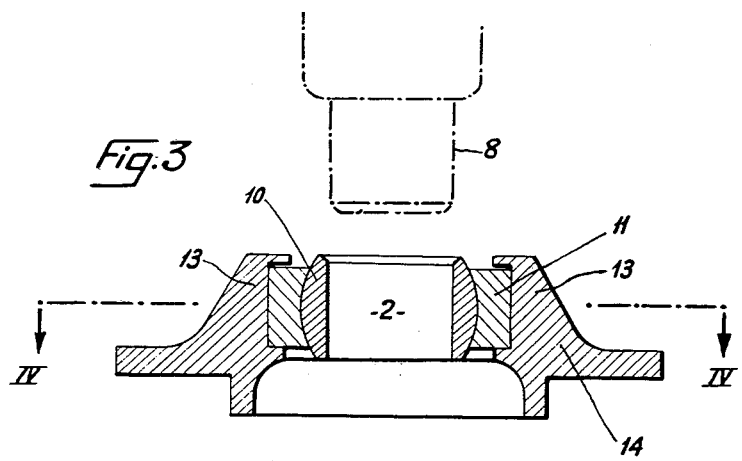
FIGS. 3 and 4 show a swivel mounting with slides adapted for a movement in a longitudinal direction, FIG. 3 being a cross-section taken along the line III—III of FIG. 4, and the latter being a cross-section along IV–IV of FIG. 3.
Figure 4:
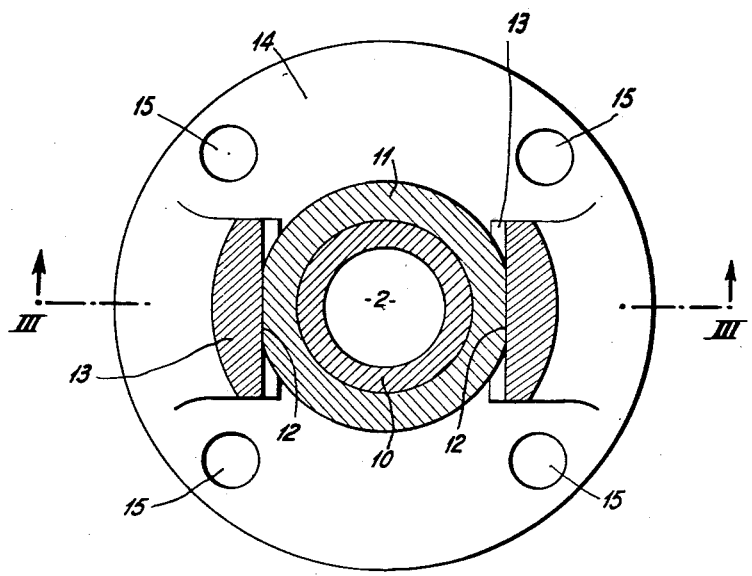

The details of these two types of support are shown on a larger scale in FIGS. 2, 3 and 4.

The cross-section of FIG. 2 shows a lateral swivel suspension 1 mounted in a housing provided by casting in the wall of the casing. The cage 3 of the swivel proper 4 is fixed on the casing 5 by means of screws 6. The swivel 4 comprises an axial bore 7 intended to receive a trunnion 8 (shown in chain-dotted lines) fixed on the nacelle (not shown), the orientation of the bore 7 being brought back to a radial position by means of a spring 9 supported against the casing 5 and acting on the swivel 4, in order that this bore can be presented in a position which facilitates assembly.

The upper or lower support 2 shown in FIGS. 3 and 4 comprises a swivel member 10 housed in a cage 11 of cylindrical form, but provided with two opposite flats 12—12 in order that it can slide between guides 13—13 rigidly fixed to a support 14 provided with holes 15 for fixing on to the casing of the jet propulsion unit.

The normal erection of the jet propulsion unit is effected by telescoping the trunnions 8 from the exterior towards the interior, both in the case of the lateral swivel members 1 and of the sliding upper or lower swivel member 2.

If, during the course of the erection of the jet propulsion unit in the nacelle, it is difficult to telescope the trunnion from the exterior towards the interior by reason of the design of this cell (in the case for example of two jet propulsion units mounted side by side), the jet propulsion unit can be introduced in the nacelle with the trunnions held in position inside the swivel members, and the trunnions are then telescoped from the interior towards the nacelle.

FIG. 5 shows an arrangement which enables the trunnion to be held in place during the lifting of the jet propulsion unit. The trunnion 8 centered in the bore 7 is held in place by a ball 16 which is engaged by the action of a spring 17 in a groove 18 formed round the support 19 of the trunnion.

After the jet propulsion unit has been lifted, the support 19 is freed from the locking ball 16 and this support is fixed on the nacelle after it has been moved a certain distance away from the swivel member so as to permit of the free movement of the swivel, the length of the trunnion 8 being of course determined to take account of this displacement of the support.

FIG. 6 shows by way of example an arrangement for fixing radially the swivel and its trunnion, of which an example of application will be given in the description following. An abutment member 20 which is supported against the inner face of the swivel 21 is centered in a bore 22 formed in the trunnion, by means of a nipple 23 having a tapped hole. A rod 24, threaded at one end and provided with a shoulder 25 at the other, is screwed into the tapped hole of the nipple 23 until the shoulder 25 comes into abutment against the inner face of the support 26 of the trunnion 27. A device, not shown in the drawing, prevents rotation of the abutment member 20 while the threaded rod is being screwed and thus enables the latter to be locked in position.

The method of suspension shown in FIG. 1 operates in the following way:

The two lateral suspension swivels 1—1 which are located on the same horizontal axis at right angles to the rolling axis, enable the axial stresses due to the thrust and to the longitudinal accelerations, and the vertical stresses due to the weight of the jet propulsion unit to be transferred from the wall of the casing to the nacelle. In addition, these swivel members absorb differentially the couples created due to rolling and to change of direction of flight. They remain of course without any effect on the couples about the horizontal axis passing through their trunnions. On the other hand, the trunnions are arranged in such a way that they leave sufficient play between their shoulders and the contact face of the swivel in order to permit of the free expansion of the casing on both sides. The lateral swivel members 1—1 can therefore no longer transmit the stresses parallel to the common axis of the trunnions, due to the changes of direction, for example during a turn.

These latter stresses are absorbed by the upper or lower sliding swivel 2, which causes them to be applied in the form of shearing stresses in the wall of the casing.

It only remains to fix the jet propulsion unit about the horizontal axis passing through the swivel members 1—1. To this end, a standard suspension is used comprising a link 28 of adjustable length (see FIG. 7) pivotally mounted at its extremities, on the one hand to the nacelle and on the other hand to the jet propulsion unit, at the rear or in front of the transverse plane of the main suspension 1—1—2.

The suspension device which has just been described is especially suitable for the normal mounting of a single unit aircraft or more generally for the case of any structure which creates the same conditions of mounting as a single unit aircraft.

In the case of jet propulsion units suspended in nacelles, it is often a disadvantage from the point of view of weight and overall dimensions to absorb the longitudinal stresses on the lateral suspension supports. Taking account of the fact that the speeds and the load factors of aircraft of this type (for example, commercial or bombing aircraft) are in general lower than the speeds and load factors of interceptors provided with the same jet propulsion unit, the arrangement shown in FIGS. 8 and 9 can be used with advantage.

This method of suspension comprises two lateral slide-swivels 2—2 which enable the stresses due to the weight of the jet propulsion unit to be passed to the casing, for vertical accelerations, and an upper swivel member 1 which enables the stresses due to the thrust of the jet propulsion unit or to the longitudinal accelerations and the stresses due to lateral accelerations of direction (during turns for example) to be transferred to the casing.

The components of efforts in a plane perpendicular to the axis of the unit are as follows: the axial and lateral forces are absorbed by the upper swivel member 1, the vertical forces by the lateral swivel members 2—2, which absorb in addition the forces created by rolling action.

There remain to be absorbed the couples about the pitch and yaw axes. For that purpose, a device shown by way of example without implied limitation is composed of two links 28a—28b pivotally mounted on the jet propulsion unit in a plane located behind that which contains the main suspension 1—2—2, and which divide these lateral and vertical couples in the following manner: the link 28a takes up the vertical loads due to the displacement of the centre of gravity of the jet propulsion unit with respect to the suspension 2—2, for the vertical accelerations, whilst the arm 28b takes up the stresses due to the displacement of the centre of gravity with respect to the suspension 1, for lateral accelerations.

The two pivotal points of the crank-arms may, depending on the case of mounting or of the form of the cell, be brought towards the front of the jet propulsion unit, as shown in FIG. 8a at 28'a—28'b.

In the case of jet propulsion units fixed laterally to the fuselage, or alternatively arranged in pairs in suspended nacelles or pods (for example four- or eight-unit aircraft with nacelles for twin jet propulsion units) the devices which take up the stresses on the exterior side are in general very heavy and very bulky. Taking account of the same considerations as for jet propulsion units suspended in nacelles (see FIGS. 8 and 9), the arrangement shown in FIGS. 10 and 11 can be used with advantage.

This suspension comprises a swivel member 1 with a horizontal axis, on the right hand side or on the left-hand side, depending on the case, and two slide-swivels 2—2 with vertical axes at the upper and lower parts of the casing. The swivel 1 (of the model described with reference to FIG. 2) laterally incorporated in the central casing 5 of the inner side, absorbs alone the axial and vertical stresses, whilst the upper and lower swivels 2—2, which are both mounted on slides 11—11, take-up the lateral forces.

The components of efforts in a plane perpendicular to the axis of the unit are as follows: the axial and vertical stresses are transmitted by the inner lateral swivel; the lateral stresses are transmitted by the upper swivel and by the lower swivel, the rolling couples are transmitted differentially by the upper and lower swivels.

If it is not possible to provide fixing points at the lower portion of the central casing, the suspension will be effected solely by the upper slide-swivel 2 and by the lateral swivel 1, which will be immobilised on its trunnion 8 in the manner described with reference to FIG. 6.

The components of efforts in a plane perpendicular to the axis of the unit are as follows: the axial and vertical stresses are transmitted by the inner lateral swivel, the lateral stresses by the upper swivel and by the lateral swivel, and the rolling couples will then be transmitted differentially by the upper swivel and by the lateral swivel.

In these two last methods of mounting, in which the jet propulsion unit is suspended laterally from the fuselage, either by three points of fixing to the central casing (one inner lateral swivel 1 and two upper and lower slide-swivels 2—2) or by two fixing points only (one inner lateral swivel 1 immobilised on its trunnion and one single slide-swivel 2 at the upper part), there remains to be absorbed the vertical and lateral stresses in the front or at the rear of the plane of main suspension.

As in the form of embodiment shown in FIG. 8, two rear links 28a, 28b are provided to take up, in the case of the first, the vertical loads due to the displacement of the centre of gravity of the jet propulsion unit with respect to the main suspension 2—2, for the vertical accelerations, and in the case of the second, the stresses due to the displacement of the centre of gravity with respect to the main suspension 1, for lateral accelerations. The two pivotal points of the links may be brought towards the front at 28'a, 28'b as shown in FIG. 10a.

Finally, FIG. 12 shows an alternative form in which the three main swivels are mounted on slides: two in the horizontal plane enabling the stresses due to the weight of the jet propulsion unit for vertical accelerations to be transferred to the casing, while the third in the vertical plane transfers to the casing the stresses due to the weight of the jet propulsion unit for lateral accelerations (during a turn for example).

A rear link 28b in the horizontal plane enables the stresses to be taken up which are due to the displacement of the center of gravity with respect to the main suspensions, for lateral accelerations such as may arise incident to turns.

A pivotal support 29 in a vertical plane in the front of the jet propulsion unit (at the top or at the bottom) permits the stresses to be absorbed due to the displacement of the centre of gravity of the jet propulsion unit with respect to the main suspension, for vertical accelerations, and the absorption of forces due to the thrust of the jet propulsion unit or to the longitudinal accelerations.

For all the forms of suspension described above, the rolling couple (due for example to the overturning couple during accelerations or decelerations of the engine) is absorbed by the two swivels which are located diametrically opposite on the main suspension device. The gyroscopic couple due to an angular speed of directional turn of the aircraft is absorbed by the point or points of the main suspension device taking-up a vertical stress and the auxiliary suspension point (at the front or at the rear) also taking-up a vertical stress. The gyroscopic couple due to the angular speed of pitching of the aircraft is absorbed by the point or points of the main suspension device taking-up a lateral stress and the auxiliary suspension point (at the front or at the rear) also taking-up a lateral stress, except in the case of FIG. 1, in which this couple is taken-up differentially by the diametrically-opposite swivels in the horizontal plane.

It is to be observed that the slides of the swivels 2 are always directed in the longitudinal sense, along the axis of the jet propulsion unit. These slide-swivels may be designed in such manner that their longitudinal displacement is limited, which enables the jet propulsion unit to be held in position ready for any repair or erection work.

The main suspension casing will preferably have three (or four) fixing plates for the swivels machined in the tolerances, thus enabling the same jet propulsion unit to be employed for types of suspension as different as the cases shown in FIGS. 1, 8, 10 and 12, the main suspension differing from one case to the other only by the position or eventually the number of slide-swivels and ordinary swivels employed.

The arrangement in accordance with the invention provides a simplification and a reduction of weight of the suspension of these jet propulsion units and it has the advantage of not necessitating any high precision in the mounting of the trunnions on the nacelle, the swivels enabling fairly considerable differences in the alignment of these trunnions to be taken-up. In addition, it enables a correct centering to be obtained of the jet-propulsion unit in its cell, the axis of the jet propulsion unit remaining immovable between the cold and hot states of the jet propulsion unit.

It will of course be understood that modifications may be made to the forms of embodiment which have just been described, in particular by the substitution of equivalent technical means, without thereby departing from the spirit of the present invention.

What is claimed is:

same manner from the point of view of dimensions and

1. A device for mounting a jet propulsion unit in an aircraft nacelle comprising a main support disposed in a plane located in the vicinity of the center of gravity of the jet propulsion unit at right angles to the unit axis and including a plurality of trunnions bolted to said nacelle and bearings each carrying one of said trunnions, said bearings having part spherical surfaces which engage in correspondingly shaped bushings mounted on the jet propulsion unit casing, at least one of said bushings being slidably mounted in a slide rigidly fixed to the casing and extending in a parallel direction with said unit axis, said trunnions and bearings being arranged to withstand stresses tangential to said casing, and a further support spaced from the main support and including at least one link having one end pivotally connected to said nacelle and the other end pivotally connected to said jet propulsion unit casing.

2. A device according to claim 1, wherein three trunnions constitute said plurality of trunnions bolted to said nacelle, and are disposed two at diametrically opposite points thereof and the third at 90° from the other two.

3. A device according to claim 2 wherein the two trunnions are disposed in a horizontal plane with respect to said unit axis when said axis is disposed to be horizontal.

References Cited in the file of this patent

UNITED STATES PATENTS

| 2,529,955 | Morley | Nov. 14, 1950 |
| 2,650,050 | Chandler | Aug. 25, 1953 |
| 2,807,934 | Purvis | Oct. 1, 1957 |

FOREIGN PATENTS

| 127,942 | Great Britain | June 4, 1919 |